(12) United States Patent
Magerle

(10) Patent No.: US 6,546,788 B2
(45) Date of Patent: Apr. 15, 2003

(54) NANOTOMOGRAPHY

(76) Inventor: Robert Magerle, Lisztstrasse 1, D-95444 Bayreuth (DE)

(*) Notice: Subject to any disclaimer, the term of this patent is extended or adjusted under 35 U.S.C. 154(b) by 0 days.

(21) Appl. No.: 09/880,619

(22) Filed: Jun. 13, 2001

(65) Prior Publication Data

US 2001/0052257 A1 Dec. 20, 2001

Related U.S. Application Data

(63) Continuation of application No. PCT/DE99/02577, filed on Aug. 17, 1999.

(30) Foreign Application Priority Data

Dec. 23, 1998 (DE) .......................................... 198 59 877

(51) Int. Cl.$^7$ ............................ G01N 27/00; G01B 7/34
(52) U.S. Cl. .......................... 73/105; 250/306; 250/307
(58) Field of Search ............................ 73/105; 750/306, 750/307

(56) References Cited

U.S. PATENT DOCUMENTS 5,021,672 A * 6/1991 Parkinson ................. 250/492.2
5,851,475 A * 12/1998 Komvopoulos et al. ..... 264/430

FOREIGN PATENT DOCUMENTS

| JP | 52-137396 | 11/1979 |
| JP | 08-160058 | 6/1996 |

OTHER PUBLICATIONS

Rettig R et al, "Atomic scale properties of interior interfaces of semiconductor heterostructures as determined by quasi-digital highly selective etching and atomic force microscopy", Physicia E, vol. 2 (1998) pp. 227–281.

Chang D C et al "Micro structural investigation of porous silicon depth profile by direct surface force microscopy", Mat. Res. Soc. Symp. Proc. vol. 405 (1996), pp. 173–177.

Kalukin A R et al "Effects of feature orientation in tomographic reconstructions", SPIE Conference on X–Ray Microfocusing Applications and Techniques, San Diego, CA, Jul. 22–23, 1998, pp. 36–44.

Harrison C et al "Layer by layer imaging of diblock copolymer films with a scanning electron microscope", Polymer, vol. 39, No. 13 (1998), pp. 2733–2744.

Vaez–Iravani M et al "Correlative imaging in scanning near–field optical microscopy", J. Vac. Sci Technol. A., vol. 11, No. 4, (1993) pp. 742–747.

* cited by examiner

*Primary Examiner*—Daniel S. Larkin
(74) *Attorney, Agent, or Firm*—Akerman Senterfitt

(57) ABSTRACT

The invention relates to a device for determining the spatial distribution of properties of a notably heterogeneous sample (1). The device comprises: a microscope (2) having a control (21) for the three-dimensional section of the topography zn (x,y) of the surface n of a sample (1); a probe (3) having a control (31) for the high-resolution detection of one or more properties Pj of the sample (1) on the topography zn(x,y) of the surface n; a device (4) for removing material, for example a plasma etching device for etching with reactive gases or liquids or for chemomechanical polishing, which has a control (41) and by means of which in a removal process An, n+1 a layer can be removed from the surface n of the sample (1); a computer-assisted image processing device (6) which is equipped such that from a sequence of surface topographies zn(x,y) to zn+m(x,y) determined by the microscope and from the properties Pj(zn(x,y)) to Pj(zn+m (x,y)) detected on said topographies it is able to generate a three-dimensional image of the sample.

43 Claims, 9 Drawing Sheets

NANOTOMOGRAPHY

CROSS-REFERENCE TO RELATED APPLICATIONS

Figure 1:
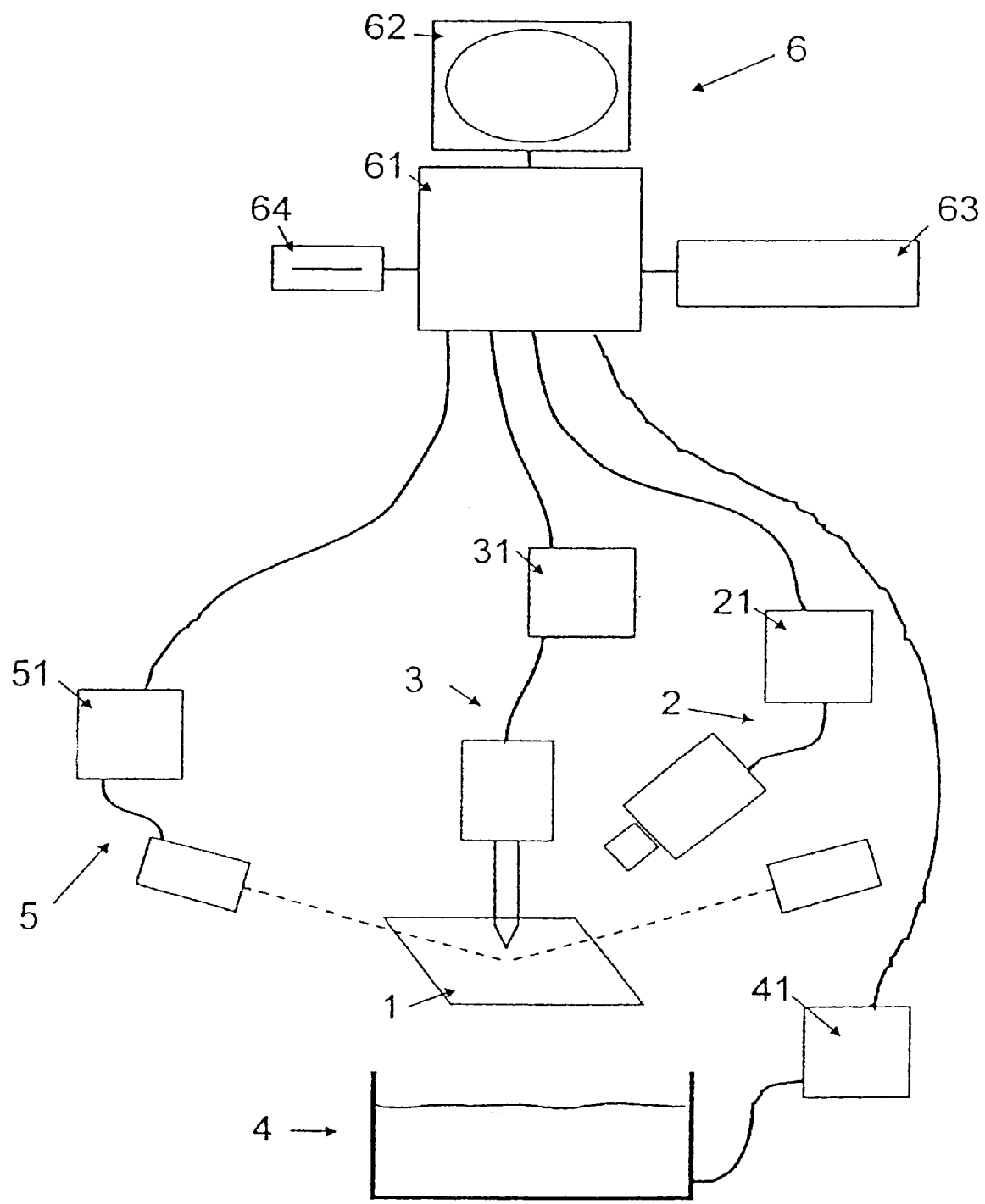

This is a continuation of PCT International Application No. PCT/DE99/02577, filed Aug. 17, 1999.

FIELD OF INVENTION

The subject matter of the present invention is a novel device and a novel method that permit the determination at high spatial resolution of the spatial structure of a sample to be examined. A plurality of different material characteristics can simultaneously be investigated, which are substantially merely limited by the specific basic method of microscopy chosen. In principle the method according to the invention allows spatial resolutions in the atomic range (100 picometer).

BACKGROUND OF THE INVENTION

Meanwhile, a plurality of methods have become available in microscopy. The most widely known methods are methods of optical microscopy, the resolving power of which is on principle limited to a range of some hundred nanometers. Considerably higher resolving power is attained in electron microscopy that exists in various types. A resolution within the range of some nanometers can be routinely obtained by means of electron microscopy. In the course of the last 15 years, further methods of microscopy were added of which the most outstanding are the methods of so-called scanning probe microscopy which permit atomic resolution in using specific probes and which may be sensitive to a plurality of material properties. Sharp metallic tips, sharp tips on a cantilever (a thin beam to be curved by external forces) or stretched tips of optical waveguides may serve as probes for example. These probes are generally run at a very close distance (some nanometers and less) across the sample (the sample is scanned) and certain material parameters are investigated at the same time. Electric currents between the surface of the sample and the tip, a mechanical distortion or torsion of the cantilever, the number of protons intercepted by the waveguide or even the attenuation of mechanical oscillations of the probe for example may serve as control parameters for controlling the spacing between the sample and the tip.

All these methods of microscopy, which have only been mentioned by way of example, have in common that they only allow the production of two-dimensional images of the objects to be examined. For anyone interested in the spatial structure of samples to be examined, the number of available methods of investigation is strongly limited.

A greater number of methods of determining structures do not investigate the spatial structure of the samples directly but in a roundabout way by making use of so-called scattering techniques (e.g. X ray scattering or neutron scattering). These scattering methods, however, are to be essentially used on objects that have a regular structure. Accordingly, scattering methods are particularly suited to determine crystal structures, but they are not to be used, or only with severe limitations, on samples having an irregular structure.

The majority of the methods that permit one to determine at high spatial resolution the spatial structure of an irregular sample is based on the fact that the volume of the sample is divided into a sequence of layers, a map of the properties of interest being built for each layer. Then, the spatial distribution of the properties of interest is reconstructed from a heap of such maps by means of appropriate mathematical methods. Various methods operate on this principle and differ in the manner of imaging the investigated properties (the contrast method) and in the way of dividing the volume of the sample in individual layers and of building the map of the properties of interest for each layer.

The best known methods to the present day are the X ray tomography and the magnetic resonance imaging technique. In both methods, but one single thin layer of the volume of the sample is nondestructively detected by an appropriate measuring technique and a map of the properties of interest is built in this layer from a large number of projections of the layer taken from various angles by means of mathematical methods. Both methods permit one to attain a spatial resolution of some micrometers. Confocal microscopy falls into this same class and permits one to build up an image of the focal plane with very little depth of definition. However, in confocal microscopy, the spatial resolution is limited to some hundred nanometers by the wavelength of the utilized light and optically transparent specimens only can be examined.

In the historically first methods of spatial reconstruction, the sample was mechanically divided into a series of individual thin layers by means of a microtome. A sequence of maps was then built from these thin sections using optical microscopy, which permitted one to reconstruct the spatial shape of the investigated objects. Today, some thin layers, of some nanometers thin, may be produced by means of an ultramicrotome and may be studied with the scanning electron microscope at a high lateral resolution (in the x-y-plane) (several nanometers are attainable). Resolution in depth (in z direction) of this method however is limited by the thickness of the thin sections employed. Said thickness is in turn limited to some several nanometers by the mechanical stability of the investigated material. A major drawback to this method is the high need for time and staff since reliable manufacturing, manipulation and investigation of the extremely thin serial sections require much experience and occur in great parts manually. Additionally, sections thus thin cannot be made from all the materials so that metals, ceramics, semiconductors and many other significant raw materials cannot be studied by using this method.

The X ray tomography and the magnetic resonance imaging technique extensively use mathematical methods to reconstruct the distribution of the property investigated in one single examined layer from a large number of projections taken from various angles. Similar methods may also be employed in electron microscopy. In particular cases, a resolution in the range of nanometers is attainable. In the thin sections, of some several nanometers thick, which are required for this purpose, the maximum time of action of the electrons that one single thin section is able to bear before it is destroyed by the beam of electrons is limited, the limited overall time of action of the electrons having to be distributed over the individual projections as a result thereof, which entails severe limitation of the image quality of the individual projections. For this reason, for the purpose of reconstructing the image, model assumptions on the symmetry of the sample must be made in order to be capable of attaining a resolution ranging in nanometers. Therefore, irregular structures in the sample cannot be determined with such a high spatial resolution.

The problem of making the sections and of the mechanical stability of the thin sections is circumvented by methods in which the sample is ablated layer by layer, the distribution of the properties of interest being determined after each ablation on the bare surface. The technique of the dynamic secondary-ion mass spectroscopy (SIMS) operates according to this method. The lateral resolution (in the x-y-plane) is, however, limited by the diameter of the beam of ions that generates the secondary ions and that, at best, is approximately 50 nm large. In the dynamic SIMS, the attainable resolution in depth (in z-direction) is limited by the depth of penetration of the beam of ions into the material (approximately 10 nm and more) and by the roughness of the sample surface prior to and more particularly during ablation. In many cases and specifically with heterogeneous samples, the material is unevenly ablated since the rate of ablation is a property that depends on the material, which causes the surface of the sample to become rough in the course of the investigation. As a result, the detected property (e.g. the concentration of a certain element) originates concurrently from various depths which drastically impairs resolution in depth of the dynamic SIMS. For this reason, many interesting (since heterogeneous) samples cannot be examined using this method, since no procedure of even ablation that suits the dynamic SIMS is known for such samples. The problem of the roughness of the sample and the irregular rate of ablation also prevents the structure of heterogeneous samples from being examined at a high spatial resolution by combining the technique of ablating layer by layer with other methods of high lateral resolution such as, e.g. the scanning electron microscope.

All the methods mentioned have in common that the volume of the sample is divided into a sequence of plane layers and that a plane 2-dimensional map of the property of interest is built for each layer. In the method of the serial sections, resolution in depth is limited by the thickness of the thin sections and amounts to some nanometers. Moreover, many materials are not suited for producing serial sections. In the methods of ablating layers, resolution in depth is in many cases severely limited by the irregular rate of ablation and by the thus occasioned roughness of the surface of the sample.

SUMMARY OF THE INVENTION

The object of the present invention is a novel device for determining the spatial distribution of properties of a specifically heterogeneous sample and a method that permits one to investigate by means of the device according to the invention the spatial distribution of properties of a sample to be examined in all the three directions of space at a spatial resolution going down to atomic resolution. Microscopic investigation directly occurs in local space, a roundabout via scattering methods is not necessary, so that specifically such samples can be examined that do not have a regular internal structure.

The device according to the invention foots on a novel combination of a microscope used for the three-dimensional detection of the topography $z_n(x, y)$ of the surface n of a sample, of a probe that detects one or several properties $P_j$ (j=1, . . . , m) of the specimen resolved in space on the topography $z_n(x, y)$ of the surface n, of an ablating device, for example a device for plasma etching, for etching with reactive gases or liquids, or for chemimechanical polishing, that is provided with a control and by means of which, in an ablative process $A_{n, n+1}$, a layer may be removed from the surface n of the sample, and of a computer-assisted image processing device that is fitted to produce a three-dimensional image of the spatial distribution of the properties $P_j$ in the sample from a sequence of surface topographies $z_n(x, y)$ to $z_{n+m}(x, y)$ and from the properties $P_j(z_n(x, y))$ to $P_j(z_{n+m}(x, y))$ detected on these topographies.

The method according to the invention foots on a novel combination of microscopy techniques, more specifically of scanning probe microscopy, that attain a very high lateral resolution, with appropriate ablative methods that act globally or locally onto the sample and permit purposeful ablation of layers from the surface of the sample, the thickness of the ablated layer ranging from the atomic range to considerably more. The spatial structure of a sample to be examined is investigated by means of a sequence of individual steps. The topography $z_n(x, y)$ of the surface n of the sample to be examined is determined by means of methods of scanning probe microscopy with very high spatial resolution. Additionally, the properties $P_j$ of interest of the sample are locally detected on the surface n, the topography $z_n(x, y)$ of which is known, by means of a probe. Examples of such properties are hardness, elasticity, coefficient of friction, conductivity, magnetization, or density of electrons, which often can be detected simultaneously with the determination of the topography, in particular when a scanning probe microscopy technique is made use of. A three-dimensional map $S_n$ of the surface n is built from the topography $z_n(x, y)$ of the surfaces n and from the properties $P_j(x, y)$ locally detected thereon and the locally determined properties of the sample are recorded on said map. Accordingly, the map $S_n$ reproduces the topography $z_n(x, y)$ with the properties $P_j(x, y)$ recorded thereon, thus representing $P_j(z_n)$.

It has to be noted in particular that the surface n of the sample is not assumed to be a plane area, the factual topography $z_n(x, y)$ is rather taken as a basis for the three-dimensional map $S_n$ built. Therefore, each single map $S_n$ will generally represent a curved area in space.

Then, a layer of the surface of the sample is globally or locally removed by means of an appropriate ablative procedure. Depending upon the sample to be examined, the ablative procedures that are available may for example be etching with reactive gases and fluids, etching with ions (plasma etching) or chemimechanical polishing. The thus generated new surface n+1 of the sample to be examined is again characterized by means of scanning probe microscopy techniques, i.e., its topography is determined and the properties of interest of the specimen are locally detected thereon. Again, a three-dimensional map $S_{n+1}$ of the surface n+1 generated by the ablating procedure $A_{n, n+1}$ is built from the topography $z_n(x, y)$ of the surface n+1 and from the properties $P_j$ locally detected thereon and the locally determined properties $P_j$ of the sample are recorded on said map, i.e., a new three-dimensional map $S_{n+1}$ of the local properties $P_j$ of the sample is created.

An image of the spatial distribution of the properties $P_j$ in the sample is created by successively ablating further layers and by subsequently characterizing the surfaces obtained. From the "heap" of the maps $S_k$ obtained therefrom and which represent the respective surfaces k after each ablation with the spatially resolved determined properties $P_j$ of the sample, it is possible to build up a three-dimensional image of the investigated properties of the sample. By means of a sequence of successive ablating and characterizing steps, it is thus possible to gradually determine the spatial structure, in particular the spatial distribution of the properties $P_j$ in the sample to be examined.

The thereby achieved lateral resolution (in the x-y plane) is limited by the lateral resolution of the methods of microscopy, more specifically of the methods of scanning probe microscopy, that is, it may be in the atomic range. The topography of the created new surface is determined in addition to the spatially resolved detection of the properties of interest, the resolution in z-direction being hereby only limited by the resolution in z-direction of the method of microscopy, more specifically of the method of scanning probe microscopy, thus being readily capable of achieving atomic resolution in this direction as well.

Accordingly, resolution in depth of the method of microscopy according to the invention is substantially determined by the average spacing $a_{k,\ k+1}$ of consecutive surfaces which are laid bare in the course of the individual ablative procedures $A_{k,\ k+1}$ and are characterized by means of methods of scanning probe microscopy.

Depending on the kind of sample that is to be examined, a plurality of different ablative methods are available that permit controlled ablation of layers of thicknesses ranging from many nanometers to fractions of nanometers. Accordingly, a combination of methods of microscopy intended to be used in detecting the topography of sample surfaces in three dimensions in space, more specifically methods of scanning probe microscopy combined with such ablation methods, permits lateral resolution and resolution in depth as well, whereby resolution may be in the atomic range (i.e. in the range of 100 picometers).

On the other end of the scale, structures or distributions of properties $P_j$ in a sample may also be studied on a scale of magnitude of micrometers and above by means of appropriate methods of microscopy. The methods of choice are in particular methods of optical microscopy and methods of scanning microscopy that are particularly devised for this purpose.

Resolution in depth (in z-direction) of the method according to the invention, as contrasted with the ablative methods of microscopy mentioned in and known from the state of the art, is not limited by the roughness r of the surface of the sample. Resolution in depth of the method according to the invention is even achieved totally irrespective of the roughness of the surface of the sample, thus not being restricted to application on substantially even, smooth surfaces as it is the case with the previously known methods.

The current teaching foots on the existence of substantially even, smooth surfaces as a basic condition for achieving a high resolution in depth. On using the method according to the invention, as contrasted to the current teaching, a resolution in depth lying within the range of sub nanometers may be achieved over the entire depth to be examined of the sample even on very uneven surfaces. In complete contrast to the current teaching, the method according to the invention also permits one to investigate single objects that have a quite strongly curved surface in all three directions in space with high spatial resolution.

Applicability of the method according to the invention to very uneven surfaces more specifically signifies that the method can be used on very heterogeneous samples in which the quantity of ablated material may strongly vary locally on account of the heterogeneity of the sample. It may as well be used on samples for which no method of uniform ablation is known. According to the current teaching, such samples could not be examined with a high resolution in depth by successive ablation and subsequent characterization of the surface, but they are fully suited to the method according to the invention, even with a high resolution in depth.

Another advantage is that a local rate of ablation of the material may be gathered from the determined data. This rate of ablation will generally be specific to the material. It may accordingly be used as a novel contrast mechanism on creating two- or three-dimensional images of the sample, said mechanism permitting one in particular to distinguish between various materials in the sample.

Furthermore, the device according to the invention and the method according to the invention are suited for complete automation. For the all-automatic characterization of a surface by means of methods of microscopy, more specifically of methods of scanning probe microscopy, a plurality of commercial instruments are available. The automatic ablation of layers; from the surface of a sample by means of ablation methods is also state of the art. Many methods of scanning probe microscopy achieve a lateral resolution that is comparable to and even better than the one achieved with scanning electron microscopy. Therefore, the method according to the invention permits one to investigate samples, which could hitherto only be examined with difficulty at high spatial resolution with the method of the serial sections and electron microscopy, at a comparable and in many cases even better spatial resolution.

Full automation of the device according to the invention and of the method according to the invention makes it possible to determine the three-dimensional structure and properties of a sample with a considerably reduced need for staff and thus at considerably reduced cost than hitherto, which renders it suited for broad industrial application.

The fact that, unlike the scanning electron microscopy or the dynamic SIMS, many methods of microscopy, more specifically of scanning probe microscopy, do not require a vacuum, contributes in rendering the method according to the invention less expensive than known methods operating in space for examining samples with irregular spatial structure and high spatial resolution.

First and foremost however, the device according to the invention and the method according to the invention allows the three-dimensional spatial detection of properties of a sample at a high spatial resolution in all three directions in space which could heretofore only be detected at high lateral resolution on the surface of the sample with the hitherto known methods of scanning probe microscopy. As a result thereof, these methods of scanning probe microscopy are extended to the third direction in space while the high spatial resolution of the scanning probe microscopy is maintained. Many of these properties as, e.g. hardness, elasticity, magnetization, conductivity, could heretofore not be spatially detected at all, or only with a considerably worse resolution, and it is only thanks to the method according to the invention that they may be spatially detected at a high spatial resolution.

The device according to the invention and the method according to the invention of detecting properties of interest of a sample in the three dimensions in space find their application in many fields of science and technique. Examples of their application are:

Detection of the structure of materials consisting of any kind of alloys (metallic, ceramic, or polymeric materials) and of composite materials.

Material testing, more specifically identification and measurement of fractures and other defects.

Study of the three-dimensional spatial structure of self-organized macromolecules.

Spatial detection of charge carrier and dopant atom concentrations in semiconductors and components of semiconductors at a hitherto unattainable spatial resolution. On principle, the position of individual dopants in the semiconductor can be detected with atomic accuracy.

Study of the spatial structure of components of semiconductors that generally consist of a sophisticated spatial array of various materials in very little space.

Investigation of biologic samples, e.g. ultrastructures of cells, viruses, and so on. If need be, dyeing may hereby be relinquished and properties of the samples may be examined that could not heretofore be detected spatially.

BRIEF DESCRIPTION OF THE DRAWING FIGURES

Further characteristics and advantages will become apparent in the subordinate claims and in the following description of exemplary embodiments that are not limiting the scope of the invention and are explained in more detail with reference to the drawing.

Figure 2:
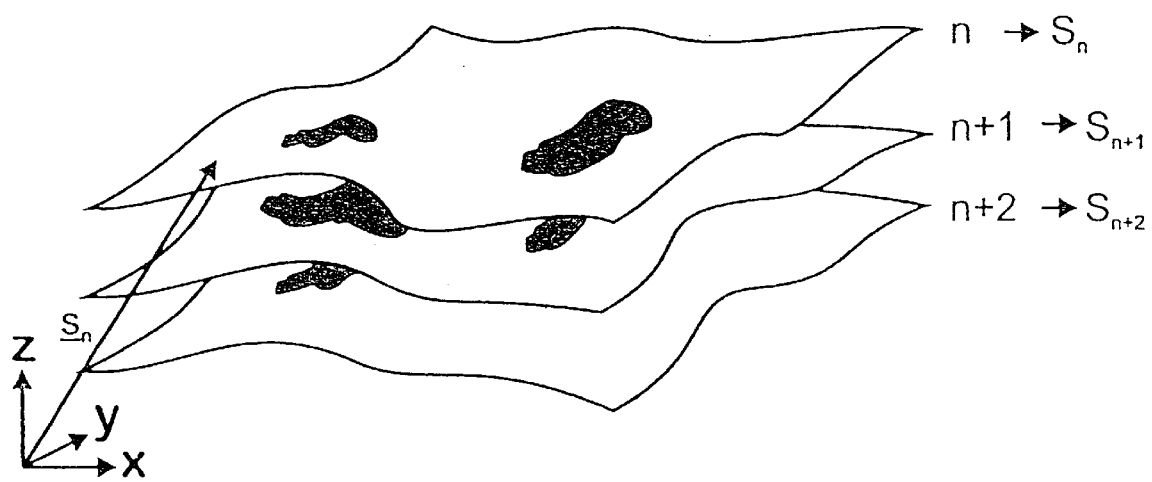
Figure 3:
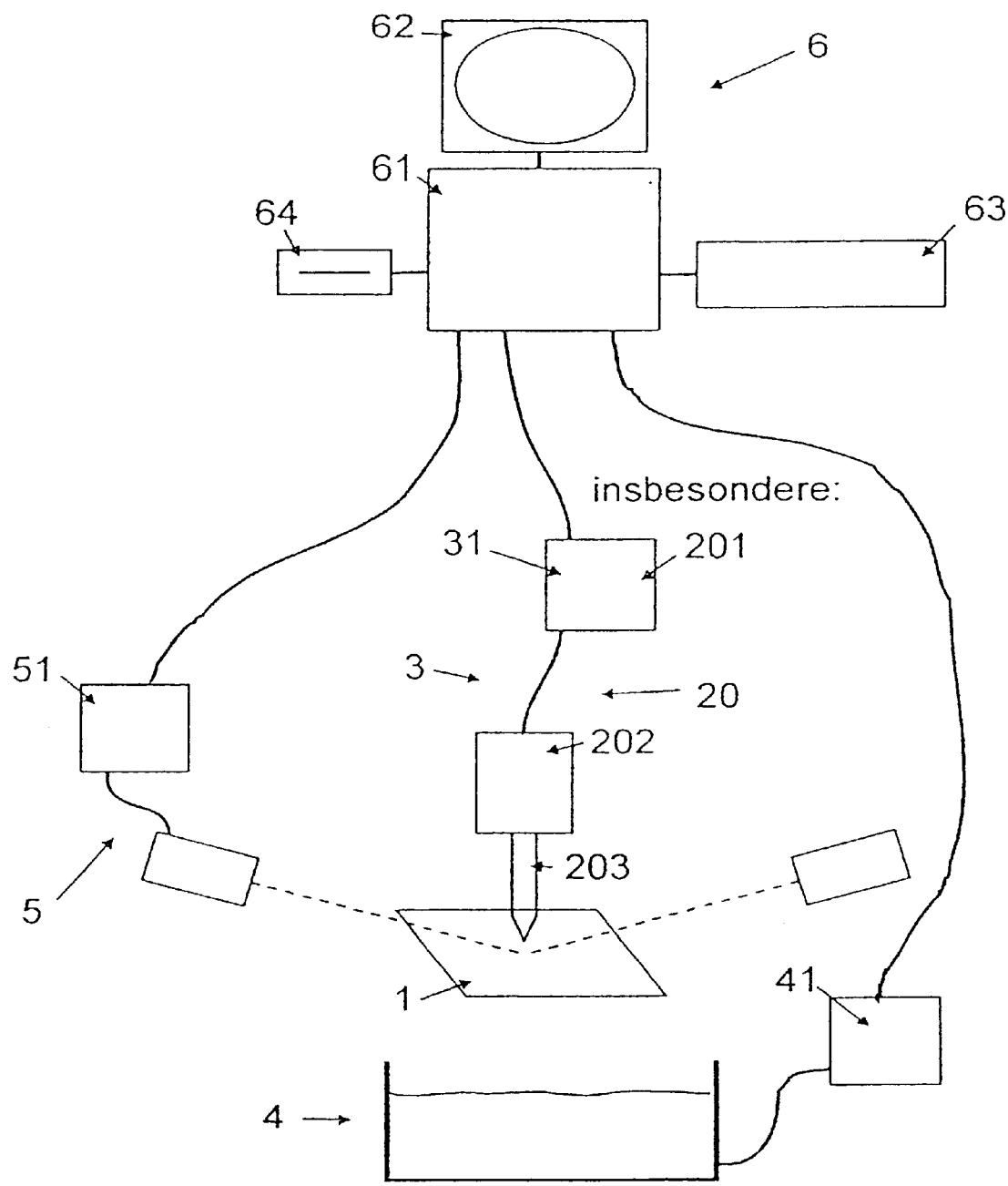
Figure 4:
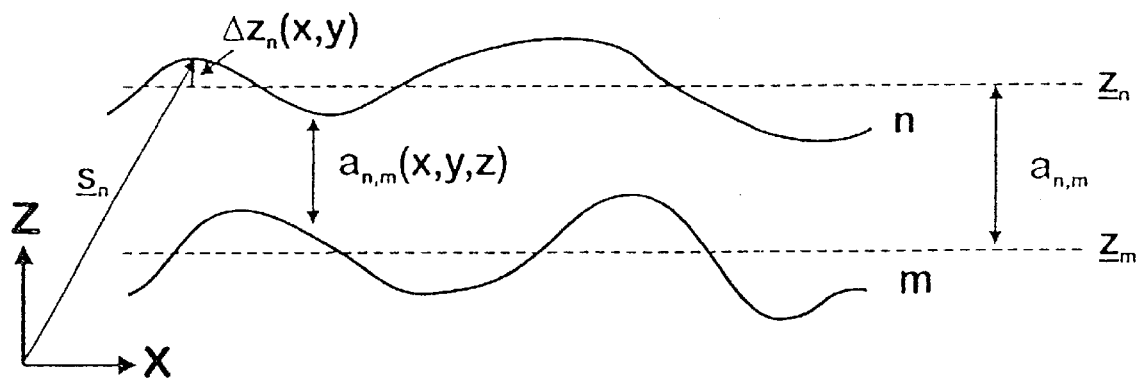
Figure 5:
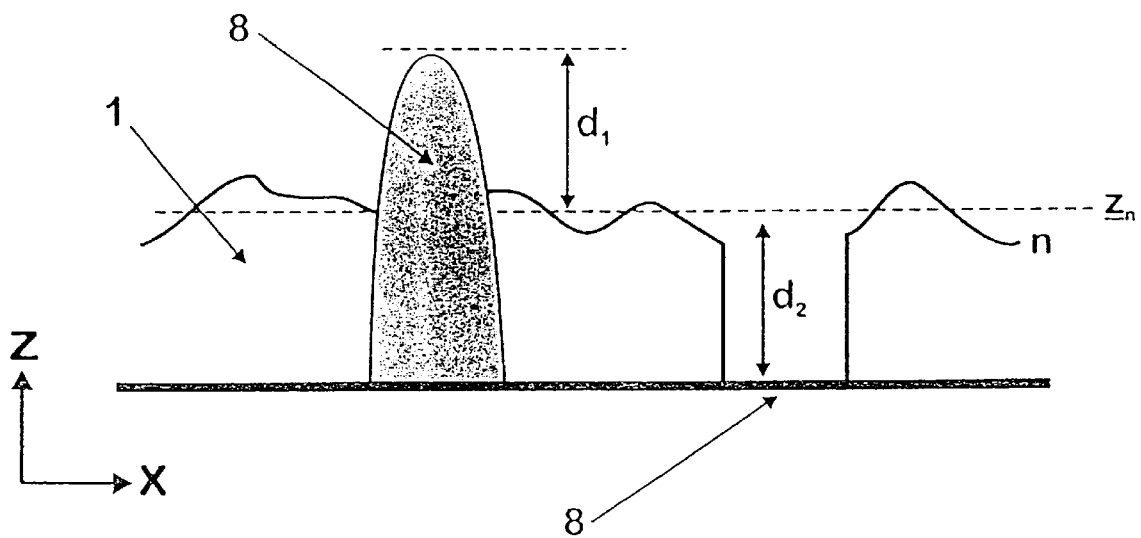
Figure 6:
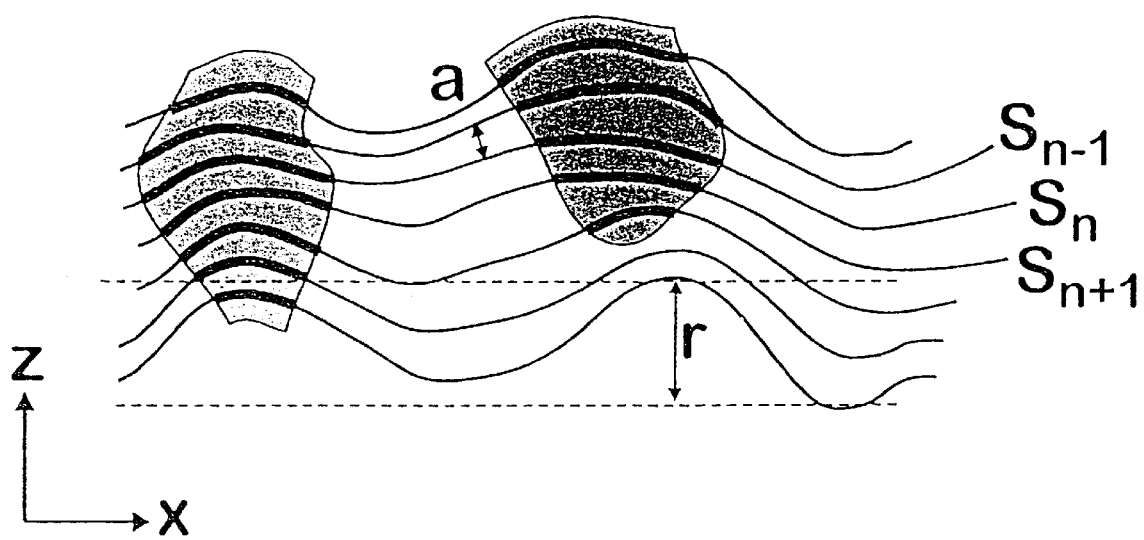
Figure 7:
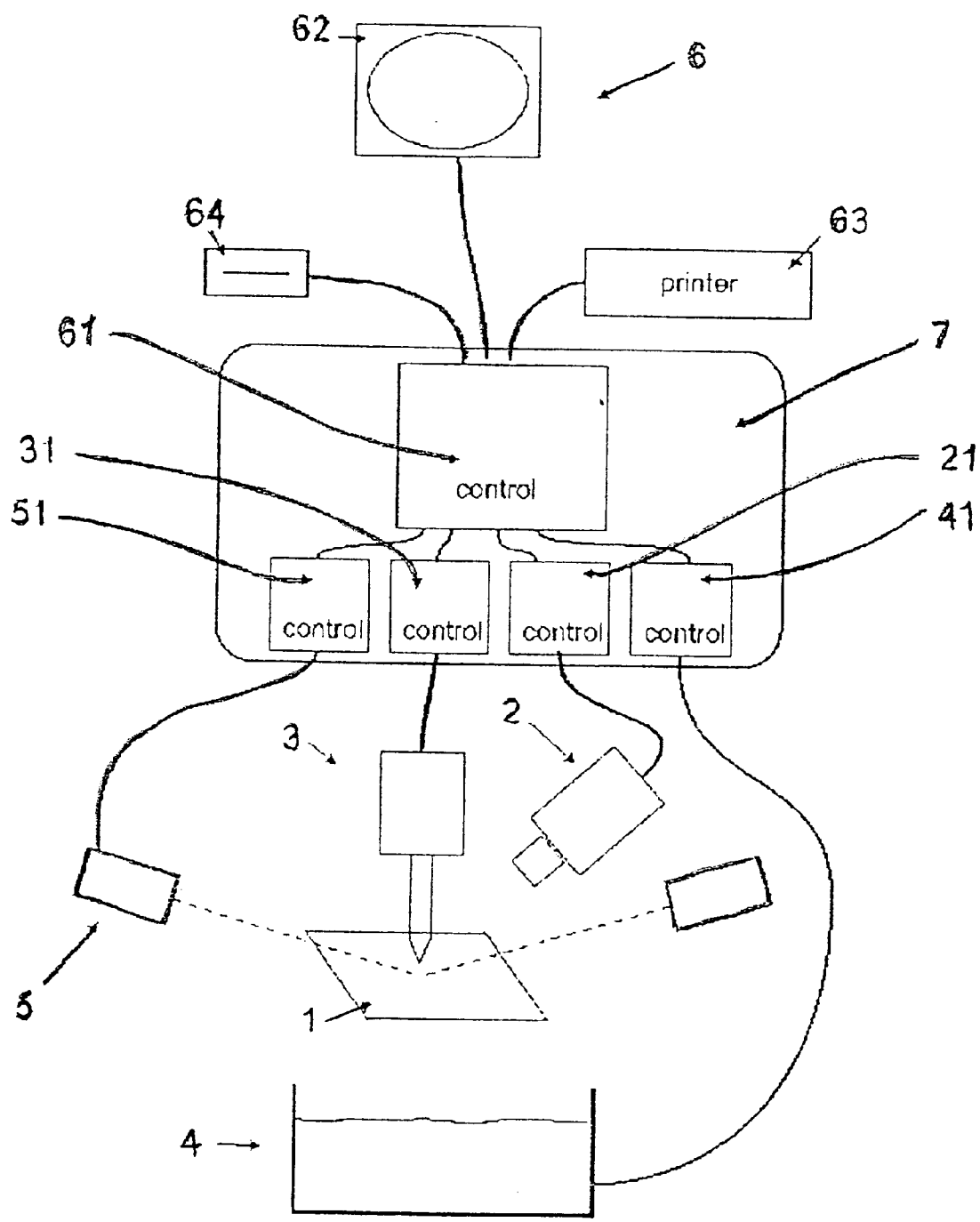
Figure 8:
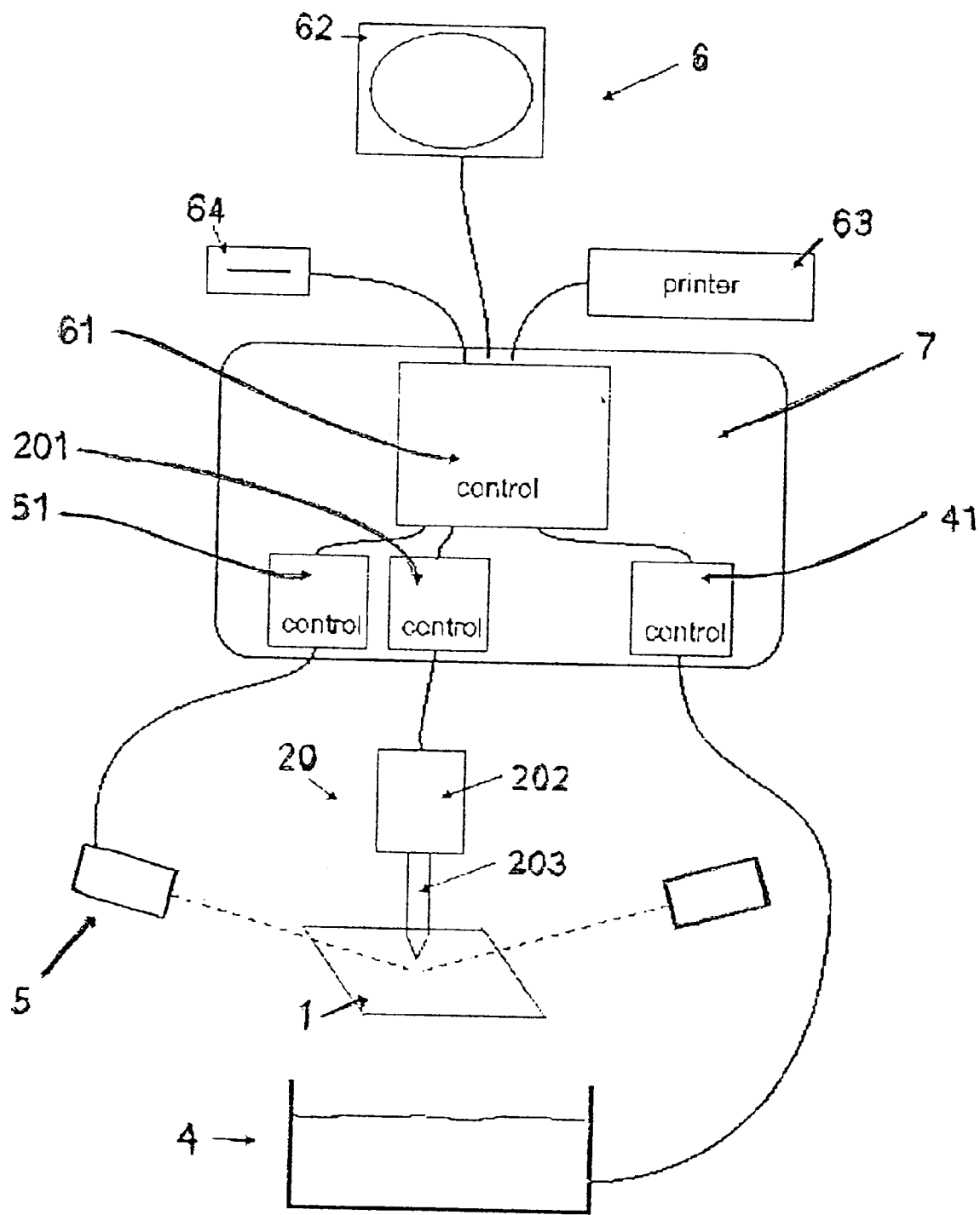
Figure 9:
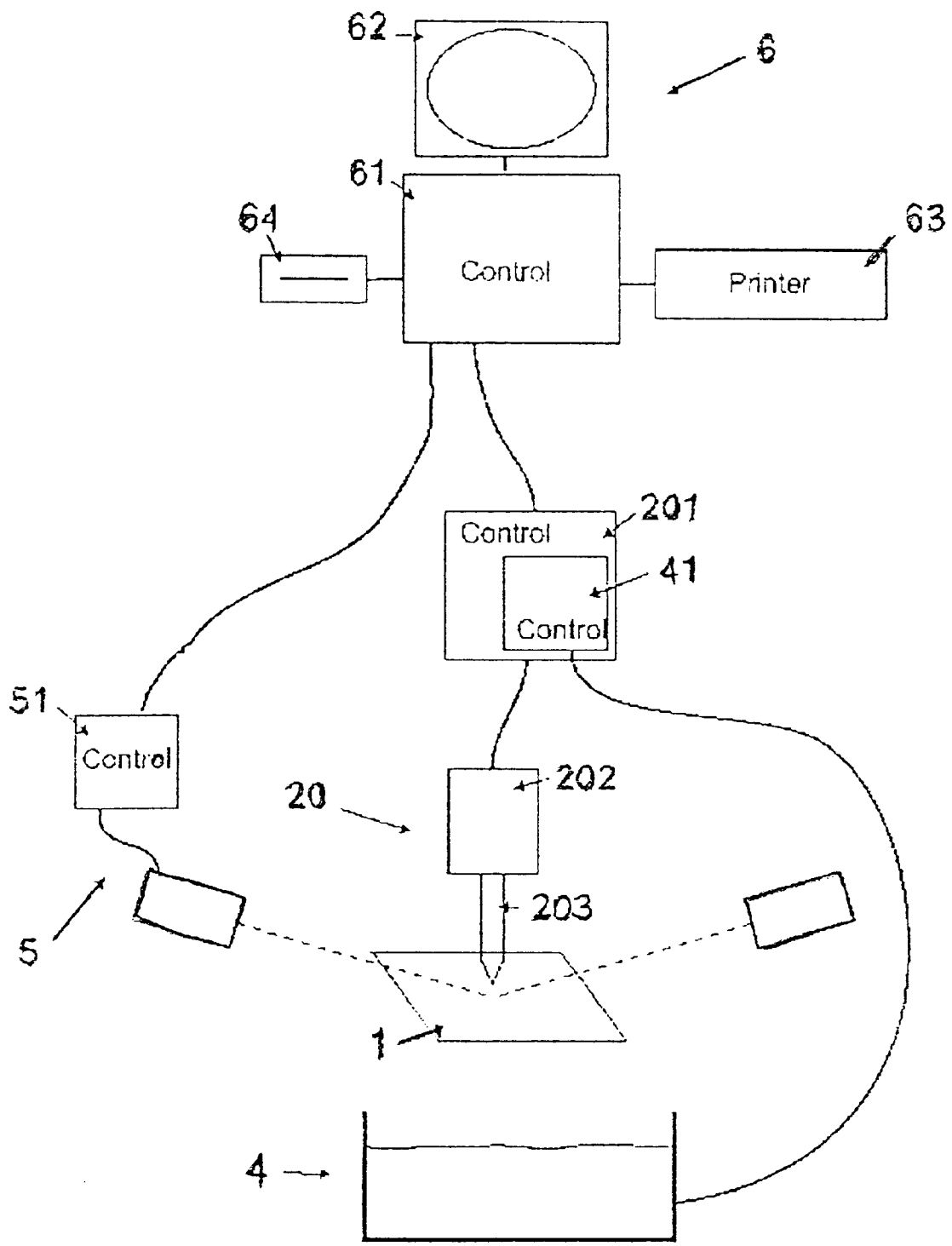
Figure 10:
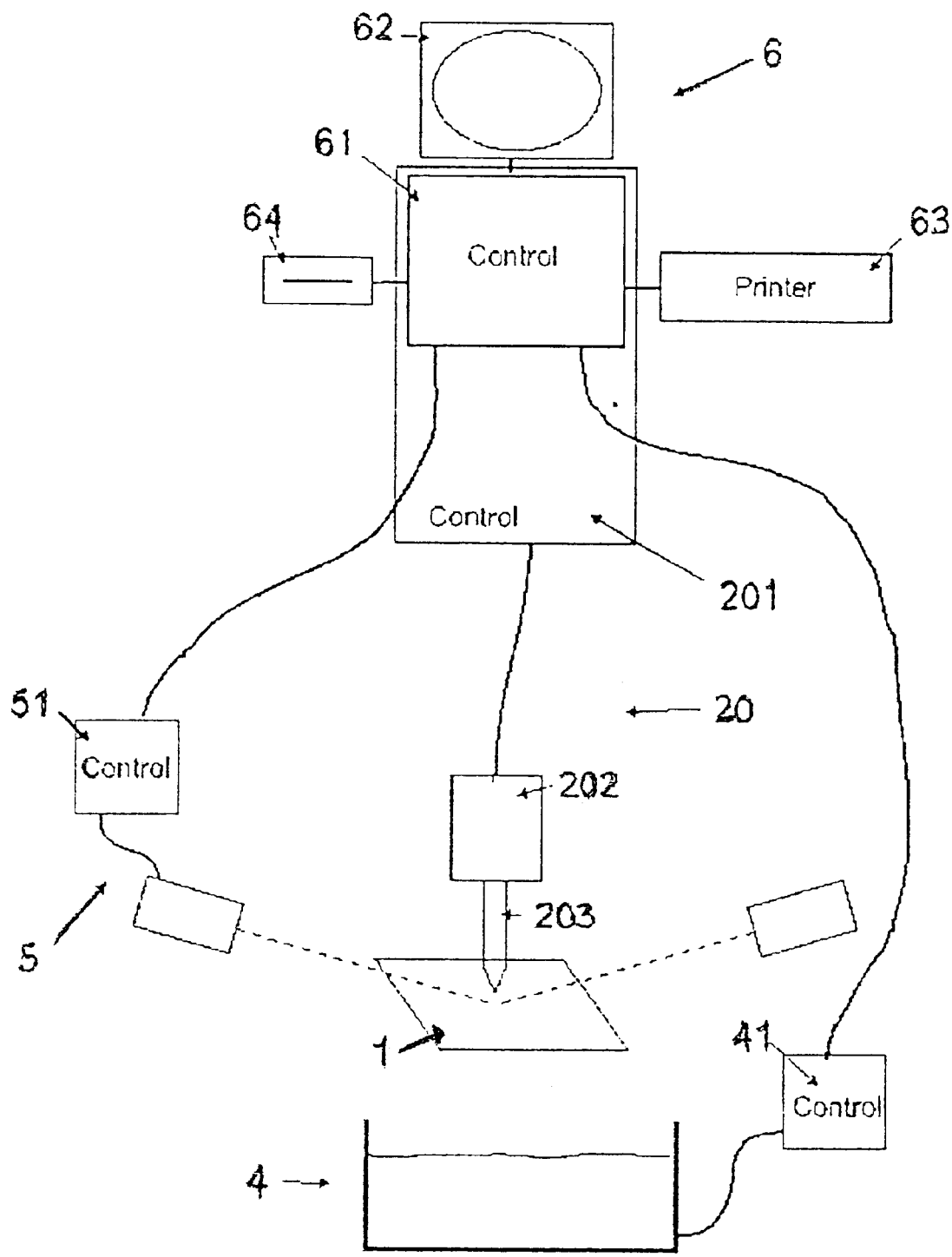

FIG. 1: shows a schematic representation of a device according to the invention, FIG. 2: shows a representation of the geometric situation on applying the method according to the invention to a sample, FIG. 3: shows a schematic representation of another device according to the invention, FIG. 4: shows a representation of two consecutive surfaces n and m, FIG. 5: shows a representation of the geometric situation on employing a marker for detecting the absolute surface positions of the sample, and FIG. 6: shows another representation of the geometric situation on applying the method according to the invention to a sample, FIG. 7: shows a schematic representation of another device according to the invention, FIG. 8: shows a schematic representation of another device according to the invention, FIG. 9: shows a schematic representation of another device according to the invention, and FIG. 10: shows a schematic representation of another device according to the invention.

DETAILED DESCRIPTION OF THE PREFERRED EMBODIMENTS OF THE INVENTION

The structure of a device according to the invention is illustrated schematically in FIG. 1. A similar device having a central control is shown in FIG. 7. The topography $z_n(x, y)$ of the surface n (see FIG. 2) of a sample 1 is detected by means of a microscope 2 that is provided with a control 21. The topography $z_n(x, y)$ is more specifically obtained as a z-component of the vector $s_n(x, y, z)$ shown in FIG. 2. The control 21 makes the topography $z_n(x, y)$ of the surface n available to further processing, the control 21 more specifically stores the topography $z_n(x, y)$.

Special optical microscopes for example are suited for detecting the topography $z_n(x, y)$. The use of an optical phase interference microscope as microscope 2 makes lateral (on the x-y plane) resolution possible in the range of the wavelength utilized, a resolution in the range of nanometers or better is possible in the z-direction. In using a confocal laser scanning microscope, lateral resolution can be increased while the resolution in the z-direction is reduced though. Structures on a larger scale can be determined in the range of many micrometers up to millimeters by means of optical microscopes.

Furthermore, a plurality of scanning probe microscopes 20 may be employed for detecting the topography $z_n(x, y)$ of the sample surface n, whereby the scanning probe microscope 20 is provided with a control 201, a head 202 and a probe 203 as shown in FIG. 3. The scanning probe microscope 20 is equipped to detect a spatial resolution the topography.

A plurality of scanning probe microscopes 20 may be used as probes 3 as well (see in particular FIGS. 3 and 8–10). For example, by means of an STM the local electron density may be detected, by means of an AFM, the coefficient of friction (frictional force microscope) or differences in material ("TappingMode™, force microscope), by means of an SNOM, local optical properties such as dielectric constant or by means of an SMNM, local magnetic properties such as magnetization or magnetic susceptibility. The use of a scanning probe microscope 20 has the advantage that the topography $z_n(x, y)$ of the sample n and the properties $P_j$ $z_n(x, y)$ thereon may be detected by means of but one device and in many cases even concurrently or in one step. In this case, the control 201 of the scanning probe microscope 20 in particular may serve as a probe control 31.

In another advantageous embodiment of the device according to the invention, the probe 3 may be relinquished, in this embodiment the device according to the invention being intended to be used for determining the spatial distribution of a parameter which characterizes a rate of ablation of a particularly heterogeneous sample.

An ablative device 4, which is provided with a control 41, makes it possible to ablate a layer of an average thickness $a_{n, n+1}$ from the surface n of the sample 1 in one ablative step or ablative procedure $A_{n, n+1}$ (See FIG. 4). This ablation may for example be performed by means of a device for plasma etching, of a device for etching with reactive gases or liquids or of a device for chemimechanical polishing. By controlling the respective process parameters, it is particularly possible to purposefully ablate layers of a predetermined average thickness $a_{n, n+1}$. The layer thickness under discussion is the globally ablated layer thickness, i.e. the mean of the locally ablated layer thickness over a certain area of the sample surface n or even over the entire sample surface n is taken. The control 41 makes the process parameters of the ablation procedure, more specifically the ablated average layer thickness $a_{n, n+1}$ (if accessible) available to further processing and more particularly stores them.

The ablating device 4 may be designed in such a way that an ablation procedure substantially acts either on the entire surface n (e.g. in case of a wet-chemical etching process) or merely in the immediate neighborhood of the probe 3. The immediate neighborhood of the probe means more specifically an area of a diameter of a few radii of the surface $M_s$ by way of which the probe 3 detects the average of the properties $P_j$ of the sample. A locally efficient ablating device 4 is for example an STM, which is operated with such parameters and in such surroundings that electrochemical reactions, more specifically electrochemical etching, takes place in the neighborhood of the tip (that is, of the probe 3).

The average layer thickness $a_{n, n+1}$ ablated in the course of one ablating step $A_{n, n+1}$ (see FIG. 4) may be detected by means of a device for measuring the layer thickness 5 which is provided with a control 51. Depending upon the structure of the sample, such a device may be an ellipsometer or an X-ray reflection meter. It is also possible to weigh the sample before and after an ablating step $A_{n, n+1}$ and to determine the ablated layer thickness $a_{n, n+1}$ from the quantity of material (mass) ablated. In case electrochemical etching is used for ablation, the ablated quantity of material and as a result thereof the average thickness of the ablated layer can be determined from the electric charge Q that has flown during one ablating step. The control 51 of the device for measuring the layer thickness 5 makes the average layer thickness $a_{n, n+1}$ ablated available to further processing and more particularly stores it.

A computer-assisted image processing device 6 that consists for example of an efficient personal computer or of a workstation and may be provided in particular with a control 61, a display 62, a printer 63 and a storing medium 64, is fitted to create a three-dimensional image of the sample 1 from a sequence of surface topographies $z_n(x, y)$ to $z_{n+m}(x, y)$ detected by microscope 2 and from the properties $P_j(z_n(x, y))$ to $P_j(z_{n+m}(x, y))$ detected on these topographies by the probe 3 and possibly from the process parameters of the ablative procedures $A_{n+i, n+i+1}$ as well that were detected by the control 41 of the ablating device 4 and from the respectively ablated average layer thicknesses $a_{n+i, n+i+1}$ that were for example detected by the control 41 of the ablating device 4 or by the control 51 of the device for measuring the layer thickness 5 as well. This image may more specifically be displayed on a display screen 62, produced on a printer 63, or stored on a storing medium 64.

In an advantageous development of the device according to the invention, the control 61 of the computer-assisted image processing device 6 is integrated into the control 21 or 201 of the microscope 2, more particularly of the scanning probe microscope 20, as shown in FIG. 10.

In another advantageous development of the device according to the invention, the control 41 of the ablating device 4 is integrated into the control 21 or 201 of the microscope 2, more particularly of the scanning probe microscope 20, as shown in FIG. 9.

In still another advantageous development of the device according to the invention, the control 21 of the microscope 2, more specifically the control 201 of the scanning probe microscope 20, as well as the control 31 of the probe 3, the control 41 of the ablating device 4, the control 51 of the measuring device 5 for determining the average layer thickness $a_{k, k+1}$, and the control 61 of the image processing device 6 or part of these controls are connected to a central control 7, and are more specifically integrated in a central control 7, as shown in FIGS. 7 and 8.

The device according to the invention can be used by means of a method according to the invention of determining the spatial distribution of properties $P_j$ of a sample 1. This method consists of the following steps:

acquisition, by means of a microscope 2, more specifically by means of a scanning probe microscope 20, of the topography $z_n(x, y)$ of the surface n of a sample 1, which substantially extends in a plane parallel to the x-y plane at $z=z_n$, and, by means of a probe 3, more specifically by means of a scanning probe microscope 20, of one or several properties $P_j(z_n(x, y))$ thereon, ablation of a layer from the surface n of the sample 1 substantially in the z-direction by means of an ablating device 4 in one ablative procedure $A_{n, n+1}$, a new surface n+1 being laid bare, repetition of the steps a) and b) m times, the respectively laid bare sample surface n+i, i=1, . . . , m being characterized in the process and ablation of a further layer from the surface n+i of the sample 1 in an ablative procedure $A_{n+i, n+i+1}$, the number m being determined by the size of the region of the sample that has to be characterized and by the resolution in depth wanted, m more specifically ranging from 10 to 1000, and creation of a three-dimensional image of the properties $P_j$ of the sample 1 from the surface topographies $z_n(x, y)$ to $z_{n+m}(x, y)$ and the properties $P_j(z_n(x, y))$ to $P_j(z_{n+m}(x, y))$ by means of a computer-assisted image processing device 6.

In an advantageous development of the afore-mentioned method, the topography $z_n(x, y)$ to $z_{n+i+1}(x, y)$ of consecutive surfaces n+i and n+i+1 only is detected and from these the spatial distribution in the sample 1 of a parameter that characterizes the local rate of ablation of a sample 1 is determined. This developed method comprises the following steps:

a) acquisition, by means of a microscope 2, more specifically by means of a scanning probe microscope 20, of the topography $z_n(x, y)$ of the surface n of a sample 1, which substantially extends in a plane parallel to the x-y plane at $z=z_n$, b) ablation of a film from the surface n of the sample 1 substantially in the z-direction in one ablative procedure $A_{n, n+1}$ by means of an ablating device 4, a new surface n+1 being laid bare, c) repetition of the steps a) and b) m times, the respectively laid bare sample surface n+i, i=1, . . . , m being characterized in the process and ablation of a further layer from the surface of the sample 1 in an ablative procedure $A_{n+i, n+i+1}$, the number m being determined by the size of the region of the sample that has to be characterized and by the resolution in depth wanted, m preferably ranging from 5 to 1000, m more specifically ranging from 10 to 500, d) determination of the layer thicknesses $a_{n+i, n+i+1}(x, y, z)$ locally ablated in the ablative procedures $A_{n+i, n+i+1}$ (see FIG. 4), and creation of a three-dimensional image of the locally ablated layer thicknesses $a_{n+i, n+i+1}(x, y, z)$ or of a parameter derived therefrom that characterizes a local rate of ablation of the sample by means of a computer-assisted image processing device 6.

Step d) of the afore-mentioned method may more specifically be realized by way of the following process: the local absolute z-position $z_n$ of a surface n is determined from an average position $z_n$ of this surface, the mean of which having been defined over suited regions and, by means of a microscope 2, more specifically by means of a scanning probe microscope 20, from the local departure $\Delta zn$ from the average position zn (See FIG. 4).

The average position $z_m$ of a surface m as it is shown in FIG. 4 may for example be determined from the average position $z_n$ of the surface n, the mean of which having been defined over suited regions, and from the added layer thicknesses $a_{n, n+1}$ to $a_{m-1,m}$ ablated in the intermediate ablative procedures $A_{n, n+1}$ to $A_{m-1,m}$ that are determined by means of a measuring device 5 for determining the ablated average layer thickness $a_{k-1,k}$.

The local absolute z-positions $z_n$ and $z_m$ of two consecutive surfaces n and m are determined from the combination of the two afore mentioned process steps, and from these positions, the layer thickness $a_{k, k+1}(x,y,z)$ locally ablated in the ablative procedure $A_{k, k+1}$ may be determined.

As an alternative to this process, a determination of the locally absolute z-position and of the average position $z_n$ of a surface n of a sample 1, the mean of which having been defined over suited regions, is possible by setting one or several reference mark(s) by means of one or several markers 8 which remain, and here more specifically their dimensions remain, substantially unaltered in the course of an ablative step. All of the local absolute z-positions may then be measured with reference to the reference marks. To determine the average position $z_n$ of a surface n, the distance $d_M$ in z-direction from objects (markers) 8 present in the sample or added thereto for this purpose may be used, e.g. ditches, balls, sample carriers and so on, the spatial dimensions and positions of which are known before the surface n is ablated and which do not alter or do not alter in a known way during the ablating procedure. This is shown in FIG. 5.

In an advantageous development of the methods discussed above, the relative lateral position in x- and y-direction of two neighboring surfaces n and n+1 or of portions of two neighboring surfaces n and n+1 is determined with the help of the position in x- and y-direction of one or several structures on a larger scale or of one or several objects on a larger scale (markers) 8, these structures) on a larger scale or these objects 8 on a larger scale being naturally present in the sample 1 or having been added for this purpose, wherein their spatial dimensions and positions are known before the surface n is ablated and do not alter or do not alter in a known way during the ablating procedure.

The previously mentioned methods of determining the local absolute z-position $z_k$ of a surface are particularly advantageous when the sample 1 has to be taken out of its working position in the microscope 2, more specifically in the scanning probe microscope 20, for performing the ablative procedures $A_{n, n+1}$.

The ablative procedures $A_{n, n+1}$ are performed by means of an ablating device 4. For the ablative procedures $A_{n, n+1}$, the sample is taken out of its working position in the microscope 2, more specifically in the scanning probe microscope 20, and is placed in a working position in the ablating device 4. Upon completion of the ablative procedure $A_{n, n+1}$, the sample is removed from the ablating device and placed back into the working position in the microscope 2, more specifically in the scanning probe microscope 20.

The ablative procedures $A_{n, n+1}$ may act globally on the entire surface of the sample 1. This is generally the case with the ablative methods mentioned: etching with reactive gases or liquids, plasma etching, or chemimechanical polishing.

In certain cases, it may be necessary or advantageous to locally ablate individual layers from the sample surface. In this case, ablative procedures may be utilized that act locally, more specifically in the direct vicinity of a probe 3. Electrochemical etching is to be cited as an example and may be realized in combination with an inert tip of an STM, for example.

A few exemplary embodiments are outlined herein after and show in detail how structures of various samples may be analyzed by means of the device according to the invention and of the method according to the invention.

1$^{st}$ EXAMPLE

The Spatial Structure of Block Copolymers which Have Undergone Microphase Separation Almost all materials consist of mixtures of different substances. The properties of the individual components may thus be combined and materials with new and custom-made properties may be produced. The thermoplastic elastomer SBR ("styrene butadiene rubber") for example consists of a mixture of hard polystyrene (PS) with soft polybutadiene (PB), a covalent bond being formed between the individual styrene and butadiene components to form larger macromolecules. Depending upon the structure of the molecule and the ratio of mixture, domains of hard PS having a size of some nanometers form in a soft (elastic) matrix of PB in the solid. Size, shape, and spatial distribution of the PS and PB domains have a decisive influence on the mechanical properties of the material SBR.

The distribution of PS and PB on the surface n of a piece of SBR may be imaged at high lateral resolution (some nanometers) by means of scanning force microscopy in the "TappingMode™". In this method, a mechanically oscillating tip is moved across the sample surface close to the sample and more specifically at a constant distance therefrom while concurrently the location of the tip and the phase position of the oscillation of the tip relative to a driving oscillation are recorded. With the help of the phase position, regions of various softness (or hardness) on the surface of the sample may be distinguished and a map of these regions may be established. Since at room temperature PB is softer than PS, the two components of the material may thus be distinguished from one another and the lateral distribution of PS and PB on the sample surface may be determined at high (lateral) spatial resolution. The topography of the sample surface n, i.e. the height $z_n$ as a function of the location (x,y) as well as a map of the surface softness, viz., the so-called phase image that is, the phase position $\phi_n$ as a function of the location (x, y) are thus obtained. The topography $z_n(x,y)$ and the phase image $\phi_n(x,y)$ may be combined to a three-dimensional map of the phase position $\phi_n(x,y,z)$ which may be interpreted as a map $S_n$ of the local mixture ratio of PS and PB on the sample surface (FIG. 2).

In order to determine the distribution of PS and PB in the sample, the sample is ablated layer by layer, the new surface created upon each ablative step being studied by means of the scanning force microscopy method. In the case of SBR, ablation may be carried out by etching off a thin layer by means of a dry etching method, e.g. ex-situ in a plasma cleaning device as it is utilized for cleaning optical components from organic impurities. In this way, a layer, of an average thickness of 5 nm, can be ablated from the sample to be examined within about 20 seconds. Upon ablation, the newly generated sample surface is again studied by means of the scanning force microscopy method and a new three-dimensional map of the phase position on this new surface that has just been laid bare is drawn. If, for etching, the sample is removed from the force microscope, it is of critical importance for the method according to the invention that after etching precisely the previously studied place of the sample be found again and imaged by means of the scanning force microscope. This may be achieved in different ways. The sample may either be mounted on a sample carrier which can be taken out of the scanning force microscope and inserted there into again with the required accuracy, or the sample must be shifted in the scanning force microscope by means of a shifting table in such a manner that the location to be studied is again placed under the tip of the scanning force microscope. To reposition the sample and to find the same location again, an optical microscope may be utilized by means of which the relative position of the sample and the tip may be observed. Additionally, images of the sample may also be produced by means of the force microscope. In both cases it is possible to get oriented with the aid of structures of the sample on a larger scale, e.g. regions with characteristic shapes, ditches, hills, dust particles, or other defects in a characteristic arrangement or of marks such as, e.g. scratches made for the purpose of orientation. A determined location on the sample can thus readily be found again with an accuracy of a few nanometers. This repositioning method can be fully automated by using well-known methods of electronically recording and processing the image.

The relative position of neighboring image points can be measured with great accuracy with the scanning force microscopy. An accuracy of up to 0.01 nanometers is attainable. By contrast, the absolute position of the surface in z-direction cannot be readily determined by means of scanning force microscopy. In order to determine in z-direction the absolute position of the surface n+1 that has been laid bare, various methods may be used. It is for example possible to orient oneself according to the previous surface n and to determine the z-position $z_{n+1}$ of the new surface n+1 in such a way that the average spacing $a_{n,n+1}(x,y,z)$ (the mean of which having possibly been calculated over individual regions) between the neighboring surfaces corresponds to the average thickness of the ablated layer $a_{n,n+1}$ (FIG. 4).

The average layer thickness $a_{n,n+1}$ ablated can be determined in a variety of ways. Either from the overall volume of ablated material, e.g. by weighing, or from the distance separating the surfaces n and n+1 (if need be, the mean may be defined over larger regions) from fixed points of reference on the sample whose dimensions and positions are known and which do not alter or do not alter in a known way during ablation, e.g. from the height of hills or, with thin layers, from the depth of ditches that extend as far as the substrate (FIG. 5). With thin layers, the thickness of the layer, the mean of which has been defined over a large region, and accordingly the average ratio of ablation as well, can be determined by means of ellipsometry or interferometry.

The same procedure is carried on until the complete sample region of interest has gradually been ablated and until the thus laid bare surfaces have been studied by means of the scanning force microscope. A series of three-dimensional maps $S_n$ is thus obtained on which the examined properties—in this case the phase position $\phi$—are recorded (FIG. 2). The spatial distribution of the phase position and, as a result thereof, the distribution of PS and PB in the sample can be determined by appropriate mathematical methods.

In a way analogous to other methods of detecting the sample layer by layer, like for example the computed tomography, consecutive maps may be superposed with great accuracy with the help of common characteristic points or shapes and may be equalized if need be (image recording).

It is a particular feature of the method according to the invention and of critical importance for the high spatial resolution in the z-direction that the maps $S_k$ generally are areas that are curved in space and that this curvature is taken into consideration when the spatial reconstruction is carried out (FIG. 6). By contrast, other methods such as for example the computed tomography or the confocal microscopy produce and use a heap of plane and equidistant maps of the properties detected. In order to be able of applying mathematical methods of spatial reconstruction and representation created for these cases for the method according to the invention, the properties $P_j$ recorded on the curved areas $S_n$ may for example be imaged by interpolation on an appropriate geometrical grating.

Spatial resolution is laterally determined by the scanning force microscopic imaging process, in this case by the radius of the tip. Present standard tips have a radius of approximately 10 nm, but tips of a radius of only 2 nm are also available. Resolution in the z-direction is substantially determined by the local spacing of two neighboring surfaces, i.e., by the average thickness $a_{n,n+1}$ of the layer ablated during one ablative step $A_{k,k+1}$ (see FIG. 6). Said thickness may also amount to 2 nm without much expense. As a result it seems possible to detect the spatial distribution of the discrete components of a polymeric material, e.g. of PS and PB in SBR, at a resolution in space of up to 2 nm in all three directions in space by means of the device according to the invention and of the method according to the invention (see FIG. 6).

2$^{nd}$ EXAMPLE

Spatial Structure of Biological Samples e.g., Ultrastructure of Individual Cells In order to produce thin sections of biological samples e.g., tissue, cells, and so on and to analyze them by means of optical microscopy and electron microscopy, the samples are often embedded in resins. These resins generally are polymers so that such thin sections are suited for immediate investigation by means of a device according to the invention by using the method according to the invention.

The cells to be studied are first saturated with low-molecular organic compounds (the monomers) that are then bonded to form longer-chain polymers (the resin) by initiating a polymerization reaction. Since various portions of a cell (membrane, nucleus, organelles, and so on) are impregnated with monomers to a varying extent and since various portions of a cell generally have different chemical compositions, the polymerization reaction of the monomers in the different portions of the cell proceeds by varying sequences on account of the presence of various cell components and yields different results. Accordingly, the various regions of a cell generally have, after embedding, different mechanical and chemical properties e.g., hardness, coloring, fluorescence, and so on, the spatial distribution of which can be detected at a high spatial resolution (a few nanometers) by means of a device according to the invention and by means of a method according to the invention.

In contrast to electron microscopy, the method according to the invention requires no vacuum and no contrasting by means of heavy metals either. No thin sections have to be produced so that no high requirements must be placed on the mechanical stability of the embedding agent. Together with the plurality of novel contrast mechanisms of the scanning probe microscopy which was used heretofore merely on sample surfaces with high lateral resolution, the combination of the method according to the invention with embedding techniques, with conventional ones and still to be developed techniques alike, promises completely novel insights into the three-dimensional spatial structure of the cells at a resolution of a few nanometers in all three dimensions in space.

3$^{rd}$ EXAMPLE

Use on Rough Surfaces

Since the device according to the invention can also be employed on highly rough surfaces by means,of a device according to the invention, it seems possible to prepare biological samples and complex fluids (e.g. dispersions and suspensions of colloidal particles) and to analyze the samples starting from the fracture area with the method according to the invention by means of a device according to the invention. Therefore, the necessary operation of a scanning probe microscope at low temperatures is conventional in this art and the preparation and analysis of crystal fracture areas at low temperatures as well.

With the method according to the invention, the procedure may be initiated directly on the sample surface of a larger piece of the material to be examined. The inside of the sample can also be studied starting from a fracture area (created by freeze fracture for example), though. Another possibility consists in studying thin sections of the material that have been applied to a solid substrate. A surface-near layer that has possibly been damaged while cutting the thin section does not impair the method, since said layer is ablated during the process. Additionally, the structure near the surface may be compared with the structure within the thin section so that damages and artefacts possibly occurring in the vicinity of the surface are thus identified.

The method according to the invention is more specifically suited for studying the structure of thin films, e.g. on glass or other base materials, that cannot be investigated with other methods, e.g. transmission electron microscopy because, e.g. the base material is either not transparent to electrons or cannot be processed to thin sections.

4$^{th}$ EXAMPLE

Structure of Semiconductor Components

The method according to the invention is not limited to polymeric materials. It is also suited for investigating the spatial structure of semiconductor components which generally consist, in the smallest possible space (some few 100 nanometers), of a sophisticated spatial array of materials of different kinds. The spatial distribution of the diverse materials in such components cannot be spatially detected with heretofore known methods since they either are not transparent enough to electrons or are not enough contrasting in electron microscopy. With ablative methods, e.g. with dynamic SIMS, they cannot be examined either because of the lack of suited methods of uniformly ablating layers. As rough surfaces and an irregular ratio of ablation constitute no hindrance for the method according to the invention, such semiconductor components can be examined at a high spatial resolution with the method according to the invention. For ablating, the manifold etching methods of the semiconductor technology may be utilized. Reactive ion dry etching in particular seems to be promising since it etches quite irrespective of the material. In order to be capable of avoiding too rough a surface, two different etching methods may for example be used in two consecutive ablative procedures to attain a relatively uniform average ablation.

In order to be capable of distinguishing from one another adjacent materials in a semiconductor component, e.g. Si, Si oxide, metals and synthetic materials, many methods in scanning probe microscopy are available. As in Example 1, differences in the hardness of the materials may for example be used. But differences in friction between the materials and the tips of the probes may also be detected. Another possibility consists in measuring the local conductivity. Scanning Capacitance Microscopy (ScaM) also permits one to measure the local charge carrier concentration and Electric Force Microscopy (EFM) permits one to measure lateral differences in the dielectric constants. In addition to the methods mentioned herein above, many more methods and contrast mechanisms in scanning probe microscopy have been developed in recent years which allow one to measure properties on sample surfaces at in parts high lateral resolutions. The device according to the invention and the method according to the invention make it possible to use these novel contrast mechanisms for the spatial detection of the corresponding properties at comparably high spatial resolution without the need for a particularly uniform ablative method.

$5^{th}$ EXAMPLE
Atomic Resolution in all of the Three Directions in Spaces

The position of individual atoms can be imaged by means of scanning probe microscopy. This is also possible in fluids, e.g. with the scanning tunneling microscopy. Suited instruments are commercially available. Such an instrument can be combined with a suited etching method, e.g. with electrochemical etching, to determine the spatial position of individual dopant atoms in a semiconductor at atomic resolution. In electrochemical etching, the charge that has flown in one ablative step can be used as a dimension for the quantity of material ablated and as a result thereof for the mean position of a surface n in the z-direction. In this method, much less than one layer of atoms is a ablated in order to make sure that no atom has been "overlooked". With the help of objects on a larger scale, e.g. atom islands or edges of monolayers, two neighboring surfaces may be brought to coincide. The thus determined lateral spacing between two neighboring surfaces (in x,y-direction) can be used for compensating thermal drift that cannot be neglected with such small dimensions and such long times of observation. In the event of slow ablation of, e.g. 10% of a monolayer in one ablative step, the local spacing between two neighboring surfaces can be numbered atom by atom with the help of individual atoms.

$6^{th}$ EXAMPLE
Use of Other Methods than Methods of Scanning Probe Microscopy The method according to the invention is not limited to scanning probe microscopy. Other methods of microscopy may be employed for detecting the property of interest P on the sample surface n and for determining the topography $z_n(x,y)$ as well. The spatially resolved property of interest $P_j$ may for example be detected with optical microscopy (e.g. reflection, fluorescence, Raman scattering, and so on). The topography $z_n(x,y)$ may for example be determined either by means of scanning probe microscopy, or by means of phase interference microscopy or even by means of confocal laser scanning microscopy. The properties of nontransparent heterogeneous samples can thus be spatially detected with optical methods at a resolution of up to 100 nm. Moreover, the method can readily be automated and does not require uniform ablation so that easy and fast wet-chemical etching, usually irregular with heterogeneous samples though, can be made use of. The method according to the invention is more specifically promising great time advantages with new materials because no special uniform ablative process needs to be developed for said new material. Another major advantage of the method according to the invention is that the instruments that exist for this purpose (e.g. a scanning force microscope with integrated optical microscope, a confocal laser scanning microscope, or a phase interference microscope) need not be modified or only to a very small extent. Modern instruments of this kind are already completely automated and computer controlled so that it would be sufficient to add an ablating device suited for the material to be examined and a software module for control and interpretation as well.

The term surface also signifies a superficial layer or film or a spatial area respectively in the vicinity of the sample surface. With several measuring methods according to the invention, the volume below the two-dimensional surface also is of importance, e.g. its conductivity, capacity, and so on. The detection of at least one property of the sample also means a detected measured variable or a signal derived therefrom. When talking about detecting at least one property of the sample on the topography of a surface, this also signifies a detection of the at least one property in the vicinity of the topography.

In a preferred embodiment, the determination of the spatial distribution of a property is combined with the detection of the spatial distribution of the rate of ablation. The spatial change of a detected property on or in the vicinity of the surface can thus be determined. This is advantageous when the volume considerably contributes to the measurement signal as it is the case when measuring the local conductivity or the charge carrier concentration. In this way, the contribution of the volume can be deduced and the resolution in depth for the property of actual interest, e.g. the conductivity in close proximity to the surface can be considerably increased. This is important for applications in the sector of semiconductors for example.

According to the invention, structures of preferably less than 1 micrometer, more specifically of less than 400 nanometers, and preferably less than 200 nanometers, can be detected. The three-dimensional doping curve of a semiconductor can be measured.

What is claimed is:

1. A device for detecting the spatial distribution of properties of a sample having a surface n, the device comprising in combination:
    a microscope, the microscope provided with a control for a three-dimensional detection of the topography $z_n(x,y)$ of the surface n of the sample;

a probe, the probe provided with a control for a spatially resolved detection of one or several properties $P_j$ of the sample on the topography $z_n(x,y)$ of the surface n;

an ablating device for etching with reactive gases or fluids or for chemimechanical polishing, and for removing a layer of the entire surface n of the sample in one ablating step $A_{n,n+1}$, wherein the ablating device is provided with a control; and a computer-assisted image processing device, the image processing device producing a three-dimensional image of the sample n from a sequence of surface topographies $z_n(x,y)$ to $z_{n+m}(x,y)$ and for the properties $P_j (z_n(x,y))$ to $P_j (z_{n+m}(x,y))$ detected on these topographies by the microscope, wherein the image processing device is provided with a control.

2. The device for, detecting the spatial distribution of properties of a sample according to claim 1, further comprising a measuring device, the measuring device comprising a control for determining the average thickness $a_{k,k+1}$ of a layer that has been ablated from the sample surface in one ablative procedure $A_{k,k+1}$ by the ablating device.

3. The device for detecting the spatial distribution of properties of a sample according to claim 2, wherein a central control is provided, and at least one of the following controls are connected to said central control: the control of the scanning probe microscope, the control of the probe, the control of the ablating device, the control of the measuring device for determining the average layer thickness $a_{k,k+1}$ that has been ablated in one ablative procedure $A_{k,k+1}$, and the control of the image processing device.

4. The device for detecting the spatial distribution of properties of a sample according to claim 1, wherein a central control is provided, and at least one of the following controls are connected to said central control: the control of the scanning probe microscope, the control of the probe, the control of the ablating device, and the control of the image processing device.

5. The device for detecting the spatial distribution of properties of a sample according to claim 1, wherein the control of the image processing device is integrated into the control of the microscope.

6. The device for detecting the spatial distribution of properties of a sample according to claim 1, wherein the control of the ablating device is integrated into the control of the microscope.

7. The device for detecting the spatial distribution of properties of a sample according to claim 1, wherein the ablating device acts globally, wherein the ablation performed by the ablating device is carried out at substantially the same time on the entire surface to be examined.

8. A device for detecting the spatial distribution of properties of a sample having a surface n, the device comprising in combination:

a scanning probe microscope for detecting at spatial resolution the topography $z_n(x,y)$ of the sample surface n and one or several sample properties $P_j$ on said topography $z_n(x,y)$, said scanning probe microscope being one of an STM (scanning tunneling microscope), an AFM (atomic force microscope), an SNOM (scanning nearfield optical microsope), or a scanning probe microscope derived therefrom, wherein said scanning probe microscope is provided with a control, a head of the microscope, and a probe;

an ablating device for etching with reactive gases or fluids or for chemimechanical polishing, and for ablating a layer of the entire surface n of the sample in one ablating step $A_{n,n+1}$, wherein said ablating device is provided with a control; and a computer-assisted image processing device, the image processing device producing a three-dimensional image of the sample from a sequence of surface topographies $z_n(x,y)$ to $z_{n+m}(x,y)$ and for the properties $P_j (z_n(x,y))$ to $P_j (z_{n+m}(x,y))$ detected on these topographies by the scanning probe microscope, wherein said image processing device is provided with a control.

9. The device for detecting the spatial distribution of properties of a sample according to claim 8, further comprising a measuring device, the measuring device comprising a control for determining the average thickness $a_{k,k+1}$ of a layer that has been ablated from the sample surface in one ablative procedure $A_{k,k+1}$ by the ablating device.

10. The device for detecting the spatial distribution of properties of a sample according to claim 8, wherein the control of the image processing device is integrated into the control of the scanning probe microscope.

11. The device for detecting the spatial distribution of properties of a sample according to claim 8, wherein the control of the ablating device is integrated into the control of the scanning probe microscope.

12. The device for detecting the spatial distribution of properties of a sample according to claim 8, wherein the ablating device acts globally, wherein the ablation performed by the ablating device is carried out at substantially the same time on the entire surface to be examined.

13. The device for detecting the spatial distribution of properties of a sample according to claim 8, wherein the ablating device is a device for plasma etching.

14. A device for determining the spatial distribution of a parameter characterizing a rate of ablation of a sample having a surface n, the device comprising in combination:

a scanning, probe microscope for detecting at spatial resolution the topography $z_n(x,y)$ of the sample surface n, said scanning probe microscope being one of an STM (scanning tunneling microscope), an AFM (atomic force microscope), an SNOM (scanning nearfield optical microscope), or a scanning probe microscope derived therefrom, wherein said scanning probe microscope is provided with a control, a head of the microscope, and a probe;

an ablating device for etching with reactive gases or fluids or for chemimechanical polishing and for ablating a layer of the surface n of the sample in an ablating step $A_{n,n+1}$, wherein said ablating device is provided with a control; and a computer-assisted image processing device for determining the quantity of material that has been locally ablated during the ablative procedures $A_{k,k+1}$, k=n, ..., n+m−1, the image processing device producing a three-dimensional image of the distribution of a parameter in the sample, wherein the parameter characterizes a local rate of ablation, and wherein the image processing device is provided with a control.

15. The device for determining the spatial distribution of a parameter characterizing a rate of ablation of a sample according to claim 14, wherein a central control is provided, and at least some of the following controls are connected to said central control: the control of the scanning probe microscope, the control of the probe, the control of the ablating device, and the control of the image processing device.

16. The device for determining the spatial distribution of a parameter characterizing a rate of ablation of a sample according to claim 14, further comprising a measuring device, the measuring device comprising a control for determining the average thickness $a_{k,k+1}$ of a layer that has been ablated from the sample surface in one ablative procedure $A_{k,k+1}$ by the ablating device.

17. The device for determining the spatial distribution of a parameter characterizing a rate of ablation of a sample according to claim 16, wherein a central control is provided, and at least one of the following controls are connected to said central control: the control of the scanning probe microscope, the control of the probe, the control of the ablating device, the control of the measuring device for determining the average layer thickness $a_{k,k+1}$ that has been ablated in one ablative procedure $A_{k,k+1}$, and the control of the image processing device.

18. The device for determining the spatial distribution of a parameter characterizing a rate of ablation of a sample according to claim 14, wherein the control of the image processing device is integrated into the control of the scanning probe microscope.

19. The device for determining the spatial distribution of a parameter characterizing a rate of ablation of a sample according to claim 14, wherein the control of the ablating device is integrated into the control of the scanning probe microscope.

20. The device for determining the spatial distribution of properties of a sample according to claim 14, wherein the ablating device acts globally, wherein the ablation performed by the ablating device is carried out at substantially the same time on the entire surface tot be examined.

21. The device for determining the spatial distribution of a parameter characterizing a rate of ablation of a sample according to claim 20, wherein the ablation performed by the ablating device is carried out in the direct surroundings of the probe only.

22. The device for determining the spatial distribution of a parameter characterizing a rate of ablation of a sample according to claim 14, wherein the image processing device is adapted for determining the locally ablated layer thicknesses $a_{k,k+1}(x,y,z)$.

23. The device for determining the spatial distribution of a parameter characterizing a rate of ablation of a sample according to claim 14, wherein the image processing device produces an image of the local rate of ablation itself.

24. A method of determining the spatial distribution of a parameter $P_j$ of a sample, the method comprising the following steps:
   a) acquisition, by means of a microscope, of the topography $z_n(x, y)$ of the surface n of the sample, which surface n substantially extends in a plane parallel to the x-y plane at $z=z_n$, and, by means of a probe, of one or several properties $P_j(z_n(x, y))$ of the sample,
   b) ablation of a layer from the entire surface n of the sample substantially in the z-direction by means of an ablating device in one ablative step $A_{n,n+1}$ whereby a new sample surface n+1 is laid bare,
   c) repetition of the steps a) and b) m times, the respectively laid bare sample surface n+i, i=1, ..., m being analyzed for their properties in the process and ablation of a further layer from the surface n+i of the sample in an ablative procedure $A_{n+i, n+i+1}$, the number m being determined by the size of the region of the sample that has to be analyzed and by the resolution in depth wanted, and
   d) creation of a three-dimensional image of the properties $P_j$ of the sample from the surface topographies $z_n(x, y)$ to $z_{n+m}(x, y)$ and the properties $P_j(z_n(x, y))$ to $P_j(z_{n+m}(x, y))$ by means of a computer-assisted Image processing device.

25. The method according to claim 24, wherein the local absolute z-position $z_k$ of a surface k of a sample is determined from an average position $z_k$ this surface k or of portions thereof and from the local departure $z_k$ from the average position $z_k$ determined by means of the microscope.

26. The method according to claim 25, wherein the average position $z_k$ of a surface k of at least a portion of the sample is determined from an average position $z_k$ of the surface k−1 and from the layer thickness $a_{k-1,k}$, ablated in the intermediate ablative procedure $A_{k-1,k}$ and determined by means of a measuring device for determining the average layer thickness $a_{k-1,k}$ ablated.

27. The method according to claim 24, wherein markers are present in the sample before the surface n is ablated, the spatial dimensions and positions of which markers are known before the surface n is ablated and which markers alter in a known way during the ablating procedure, and, for determining the average position $z_k$ of at least a portion of the surface K of the sample, the spacings $d_M$ in z-direction of said portion of the surface k from the markers are used.

28. The method according to claim 24, wherein objects are present in the sample before the surface n is ablated, the spatial dimensions and positions of which objects are known before the surface n is ablated and which objects alter in a known way during the ablating procedure, the relative lateral position in the x- and y-direction of at least portions of two neighboring surfaces n and m of the sample being determined with the help of the position in the x- and y-direction of the objects.

29. The method according to claim 24, wherein the ablating device used for ablating a layer from the surface of the sample to be analyzed acts globally.

30. The method according to claim 24, wherein ablating a layer from the sample surface by means of the ablating device is carried out at least one of in situ and ex situ, and is inserted into an operational position in the ablating device.

31. The method according to claim 30, wherein the layer is ablated from the sample surface without the need for removing the sample from an operational position in the microscope.

32. The method according to claim 24, wherein m ranges from 5 to 1000.

33. The method according to claim 30, wherein the layer is ablated from the sample surface by removing the sample from the operational position in the microscope.

34. A method of determining the spatial distribution of a parameter in a sample which parameter characterizes the local rate of ablation of a sample, comprising the following steps:
   a) acquiring, by means of a microscope, the topography $z_n(x, y)$ of the surface n of the sample, which surface n substantially extends in a plane parallel to the x-y plane at $z=z_n$,
   b) ablating a layer from the entire surface n of the sample substantially in the z-direction in one ablative step $A_{n, n+1}$ by means of an ablating device, whereby a new sample surface n+1 is laid bare,
   c) repeating the steps a) and b) m times, the respectively laid bare sample surface n+i, i=1, ..., m being each analyzed for their properties in the process and ablating a further, layer from the surface of the sample in an ablative procedure $A_{n+i, n+i+1}$, the number m being determined by the size of the region of the sample that has to be characterized and by the resolution in depth wanted,
   d) determining the layer thicknesses $a_{n+i, n+i+1}(x, y, z)$ locally ablated in the ablative procedures $A_{n+1, n+i+1}$, and
   e) establishing a three-dimensional image of the locally ablated layer thicknesses $a_{n+i, n+i+1}(x, y, z)$ or of a parameter derived therefrom that characteries a local rate of ablation of the sample by means of a computer-assisted image processing device.

35. The method according to claim 34, wherein the local absolute z-position $z_k$ of a surface k of a sample is determined from an average position $z_k$ of this surface k or of portions thereof and from the local departure $z_k$ from the average position $z_k$ determined by means of the microscope.

36. The method according to claim 35, wherein the average position $z_k$ of a surface k of at least a portion of the sample is determined from an average position $z_k$ of the surface k−1 and from the layer thickness $a_{k-1,k}$, ablated in the intermediate ablative procedure $A_{k-1,k}$ and determined by means of a measuring device for determining the average layer thickness $a_{k-1,k}$ ablated.

37. The method according to claim 34, wherein markers are present in the sample before the surface n is ablated, the spatial dimensions and positions of which markers are known before the surface n is ablated and which markers alter in a known way during the ablating procedure, and, for determining the average position $z_k$ of at least a portion of the surface k of the sample, the spacings $d_M$ in z-direction of said portion of the surface k from the markers are used.

38. The method according to claim 34, wherein objects are present in the sample before the surface n is ablated, the spatial dimensions and positions of which objects are known before the surface n is ablated and which objects alter in a known way during the ablating procedure, the relative lateral position in the x- and y-direction of at least portions of two neighboring surfaces n and m of the sample being determined with the help of the position in the x- and y-direction of the objects.

39. The method according to claim 34, wherein the ablating device used for ablating a layer from the surface of the sample to be analyzed acts globally.

40. The method according to claim 34, wherein ablating a layer from the sample surface by means of the ablating device is carried out at least one of in situ and ex situ, and is inserted into an operational position in the ablating device.

41. The method according to claim 40, wherein the layer is ablated from the sample surface without the need for removing the sample from an operational position in the microscope.

42. The method according to claim 34, wherein m ranges from 5 to 1000.

43. The method according to claim 40, wherein the layer is ablated from the sample surface by removing the sample from the operational position in the microscope.

* * * * *